G. G. F. BOSWELL.
SHOCK ABSORBER.
APPLICATION FILED DEC. 8, 1916.
1,242,316.
Patented Oct. 9, 1917.
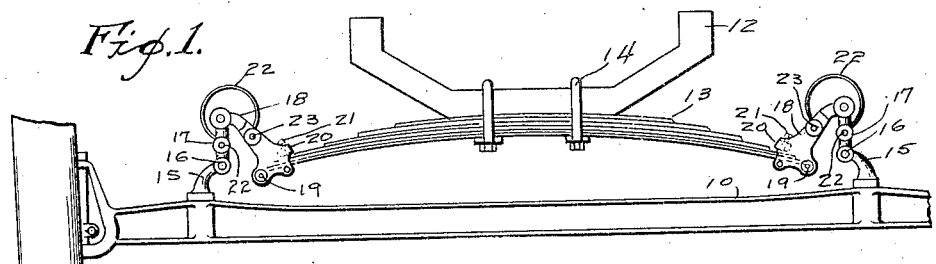
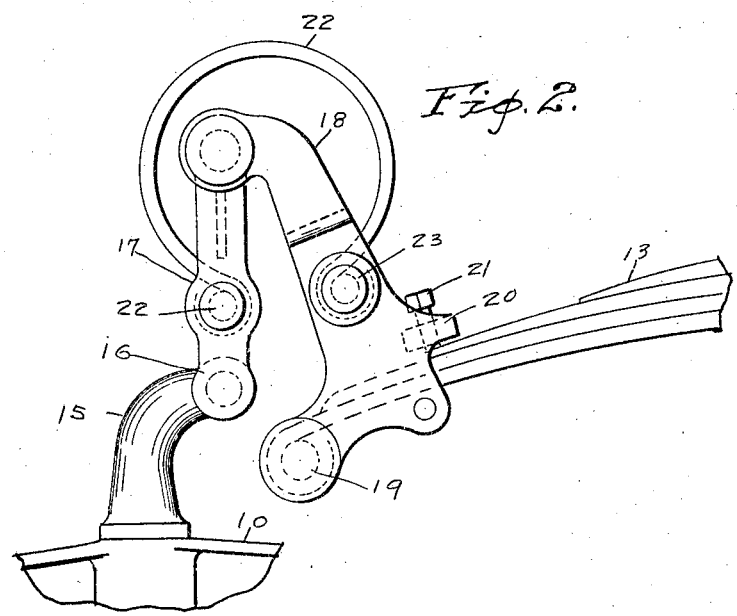
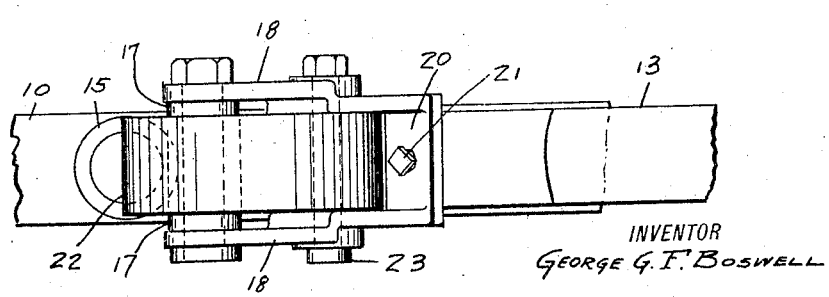
INVENTOR
GEORGE G. F. BOSWELL
BY
Lockwood & Lockwood
ATTORNEYS

UNITED STATES PATENT OFFICE.

GEORGE G. F. BOSWELL, OF INDIANAPOLIS, INDIANA.

SHOCK-ABSORBER.

1,242,316.  Specification of Letters Patent.  Patented Oct. 9, 1917.

Application filed December 8, 1916. Serial No. 135,782.

*To all whom it may concern:*

Be it known that I, GEORGE G. F. BOSWELL, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like letters refer to like parts.

This invention relates to shock absorbers which are especially adapted to be used on Ford automobiles or automobiles having springs of similar construction.

The main feature of the invention lies in the peculiar construction of the shock absorbing spring and its associated parts so that none of the elasticity of the main spring will be lost and it will not be necessary to use clamps thereon which will deprive it, to some degree, of its function as a spring and take the life from it. In this respect the end motion of the spring is utilized.

Still another feature of the invention is the simplicity of the construction which will permit it to be cheaply made and quickly installed as none of the parts of the original spring construction is changed.

The full nature of the invention will be understood from the accompanying drawings and the following description and claims:

In the drawings, Figure 1 is a front elevation of the front axle of an automobile with the spring and shock absorber thereon. Fig. 2 is a side elevation of the shock absorber and associated parts. Fig. 3 is a plan view looking down on the shock absorber, as shown in Fig. 2.

In the drawings there is shown the front axle 10 of an automobile, a wheel 11, a frame 12 and a front spring 13 secured to said frame by the U-bolts 14. Rigidly secured at each end of said axle there are projecting members or supports 15 to which is pivoted at 16 a vertical bar 17. Pivoted at the other end of said pivot bar there is an L-shaped spring supporting shackle 18 which is pivoted at its lower end to the end bearings 19 of the front spring. Said supporting shackle is provided with a heel bar 20 which lies adjacent the upper side of the front spring and is adjusted thereto by a set screw 21 for adjusting the tension of the shock absorber. A looped spring made of spring steel 22 is secured to the supporting shackle at 23 and loops around over the end thereof and is secured at its other end to the supporting pivot bars 17. Said spring 22 is adapted to act as the resilient and yielding member of the shock absorber so that minor shocks, which the front spring would not absorb, due to its heavy construction, would be taken up by the looped string and absorbed thereby, permitting the front spring to take the extreme low position shown by dotted lines in Fig. 2, or the position shown in Fig. 1, between which positions it will be free to oscillate.

The invention claimed is:

1. The combination with the axle and a semi-elliptical spring of a vehicle, of a shock absorber including a substantially vertical pivot bar carried by the axle and pivoted at its lower end, a spring supporting shackle pivotally connected at its lower end with the end of the vehicle spring and at its upper end with the upper end of the pivot bar so as to have a swinging movement on said pivot bar as the spring lengthens under the influence of a load, and a spring connected with said pivot bar and shackle which tends to force the shackle away from the pivot bar.

2. The combination with the axle of a vehicle, a post extending upwardly therefrom, and a semi-elliptical spring for supporting the body of the vehicle, of a shock absorber including a substantially vertical pivot bar pivoted at its lower end to said post, a spring supporting shackle pivotally connected at its upper end with the end of the pivot bar so as to have a swinging movement on said pivot bar as the spring lengthens under the influence of a load, and a spring connected with said pivot bar and spring supporting shackle which tends to resist the swinging movement of said member under the influence of the load.

3. The combination with the axle and a semi-elliptical spring of a vehicle, of a shock absorber including a substantially vertical pivot bar carried by the axle and pivoted at its lower end, a spring supporting shackle pivotally connected at its lower end with the end of the vehicle spring and at its upper end with the upper end of the pivot bar so as to have a swinging movement on said pivot bar as the spring lengthens under the influence of a load, and a looped spring with one end of the loop pivoted to said bar and the other end to said shackle which tends to resist the swinging movement of said member under the influence of the load.

4. The combination with the axle and a semi-elliptical spring of a vehicle, of a shock absorber including a substantially vertical pivot bar carried by the axle and pivoted at its lower end, a substantially L-shaped spring supporting shackle with the upper end thereof pivoted to the upper end of the vehicle spring and at the heel thereof bearing on the upper side of the vehicle spring, and a spring connected with said pivot bar and spring supporting shackle which tends to resist the swinging movement of said member under the influence of the load.

5. The combination with the axle and a semi-elliptical spring of a vehicle, of a shock absorber including a substantially vertical pivot bar carried by the axle and pivoted at its lower end, a shackle pivotally connected at its lower end to the end of the vehicle spring and normally extending upward perpendicularly from said spring and with its upper end pivoted to the upper end of the pivot bar, and a spring connected with said pivot bar and spring supporting shackle which tends to resist the swinging movement of said member under the influence of the load.

6. The combination with the axle and a semi-elliptical spring of a vehicle, of a shock absorber including a substantially vertical pivot bar carried by the axle and pivoted at its lower end, a substantially L-shaped spring supporting shackle with the upper end thereof pivoted to the upper end of the vehicle spring and at the heel thereof bearing on the upper side of the vehicle spring, a spring connected with said pivot bar and spring supporting shackle which tends to resist the swinging movement of said member under the influence of the load, and means in the heel of said shackle for adjusting the position of the heel with relation to the vehicle spring.

In witness whereof, I have hereunto affixed my signature.

GEORGE G. F. BOSWELL.